(12) United States Patent
Simpson

(10) Patent No.: US 7,054,019 B1
(45) Date of Patent: May 30, 2006

(54) METHOD AND SYSTEM FOR TRACKING THE CURRENT DATE AND TIME WITH A PRINTER AND OPERATING THE PRINTER ACCORDINGLY

(75) Inventor: Shell S. Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 913 days.

(21) Appl. No.: 09/654,815

(22) Filed: Sep. 5, 2000

(51) Int. Cl.
*G06F 15/00* (2006.01)
*G07F 1/00* (2006.01)

(52) U.S. Cl. .................. 358/1.15; 358/1.15; 705/14

(58) Field of Classification Search ........... 358/1.15, 358/1.18, 407; 347/253, 248, 14, 15; 399/8; 340/3.1, 3.3; 705/14, 26; 379/93.17, 100; 101/425; 713/178, 153; 709/206, 219
See application file for complete search history.

(56) References Cited

U.S. PATENT DOCUMENTS

| | | | | |
|---|---|---|---|---|
| 5,581,669 A | * | 12/1996 | Voth | 358/1.14 |
| 5,822,508 A | * | 10/1998 | Ohara | 358/1.15 |
| 5,940,652 A | * | 8/1999 | Hirakawa | 399/8 |
| 6,219,085 B1 | * | 4/2001 | Hanna | 347/249 |
| 6,594,028 B1 | * | 7/2003 | Hamamoto et al. | 358/1.15 |
| 6,694,043 B1 | * | 2/2004 | Seder et al. | 382/100 |
| 6,932,523 B1 | * | 8/2005 | Yamada et al. | 400/78 |
| 2003/0123079 A1 | * | 7/2003 | Yamaguchi et al. | 358/1.15 |
| 2005/0099646 A1 | * | 5/2005 | Jeyachandran et al. | 358/1.14 |

FOREIGN PATENT DOCUMENTS

| | | |
|---|---|---|
| GB | 2334404 | 8/1999 |
| JP | 62187279 A | 6/1987 |
| JP | 01169392 | 7/1989 |
| JP | 06244999 | 9/1994 |
| JP | 09200419 | 7/1997 |
| JP | 2000163242 | 6/2000 |
| WO | WO91/10973 | 7/1991 |

* cited by examiner

*Primary Examiner*—Kimberly Williams
*Assistant Examiner*—Saeid Ebrahimi-Dehkordy

(57) ABSTRACT

Printer drivers in printer clients which have internal clocks take time/date data from the clock of the printer client and append that data to each transmission of a print job to a connected printer. The printer's processor extracts that time/date data from the print job transmission and uses that time or automatically set or adjust the time kept by a clock circuit internal to the printer. In this way, the printer's clock circuit consistently provides accurate time/date data that can be used to more efficiently manage the operation of the printer.

31 Claims, 5 Drawing Sheets

METHOD AND SYSTEM FOR TRACKING THE CURRENT DATE AND TIME WITH A PRINTER AND OPERATING THE PRINTER ACCORDINGLY

FIELD OF THE INVENTION

The present invention relates to the field of printing devices and printer operation. More specifically, the present invention relates to a method and system for tracking the current date and time with a printer. The present invention also relates to methods of efficiently operating the printer according to the current date and time to best suit the needs of printer users.

BACKGROUND OF THE INVENTION

In the past, most printers have typically not had any function or hardware for tracking the current date or time. Print jobs are simply executed and printer operations are handled without any reference to the current date or time.

Some high-end printers may include a clock circuit, but have required the user to set the clock by inputting a date and time using a control panel on the printer unit. Because the printer's operation does not depend on the date or time, however, many users do not make the effort required to learn the procedure for setting the printer clock through the printer control panel or simply do not take the time to set the clock when needed. Moreover, both the clock circuit and control panel for setting the clock circuit add to the expense of the printer.

As will be disclosed herein, there are advantages in the field of printer operation that can be derived when the printer is tracking the current date and time. Consequently, there is a need in the art for a method and system of tracking the current date and time with a printer. There is a further need in the art for methods of advantageously operating the printer in accordance with the current date and/or time.

SUMMARY OF THE INVENTION

The present invention meets the above-described needs and others. Specifically, the present invention provides a method and system of tracking the current date and time with a printer. The present invention also provides for methods of advantageously operating the printer in accordance with the current date and/or time.

The present invention may be embodied and described as a system for tracking time and date with a printer and managing that printer accordingly. The system of the present invention preferably includes a printer or printing device having a clock circuit and one or more printer clients, each having its own clock circuit. The printer driver of the printer client appends time/date data from the clock circuit of that printer client to a print job being transmitted to the printer. The printer then extracts the time/date data from the print job transmission and uses that time/date data to set or adjust the clock circuit of the printer. In this way, the printer's clock circuit is automatically set without requiring any user action.

Additionally, the printer may compare the time/date data received with the incoming print job to time/date data from the clock circuit of the printer or other time/date data received with other print jobs. If the incoming time/date data is beyond a predetermined threshold, for example a standard deviation from the other time/date data, the printer may reject the incoming data as erroneous. Otherwise, the printer averages the time/date data received with the print job with other time/date data received with other print jobs and then sets or adjusts the clock circuit of the printer according to a resulting average of all the time/date data. This provides a more accurate time/date setting for the printer's clock circuit. The clock circuit of the printer may be connected to a battery as a back-up power source.

The output of the printer's clock circuit can then be used to more efficiently manage the operation of the printer. For example, the printer may be maintained in an operating mode during pre-defined hours and days based on output from the clock circuit of the printer. Consequently, during those pre-defined hours, no time is lost waiting for the printer to switch out of a power-save mode. Similarly, the printer may avoid performing a calibration procedure during pre-defined hours and days based on output from the clock circuit of the printer. Thus, no time is wasted during those pre-defined times waiting for the printer to finish the calibration procedure.

The present invention also includes all the methods of making and operating the system described above. For example, the present invention encompasses a method of tracking time and date with a printer by appending time/date data to a print job sent to the printer from a printer client having a clock circuit. As above, the method also includes extracting the time/date data from the print job and using the time/date data to set or adjust a clock circuit of the printer. The printer is then operated accordingly.

Finally, the present invention encompasses the computer-readable instructions, software or firmware, required to cause the printer client devices and the printer to operate in the manner described above, i.e., according to the principles of the present invention. Specifically, the present invention encompasses computer-readable instructions recorded in a medium for storing computer-readable instructions, where (1) a first set of the instructions causes a processing device in a printer client device to append time/date data to a print job sent to the printer, the printer client device having a clock circuit that outputs time/date data; and (2) a second set of the instructions cause a processing device in the printer to extract the time/date data from the print job and use the time/date data to set or adjust a clock circuit of the printer.

BRIEF DESCRIPTION OF THE DRAWINGS

The accompanying drawings illustrate exemplary embodiments of the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
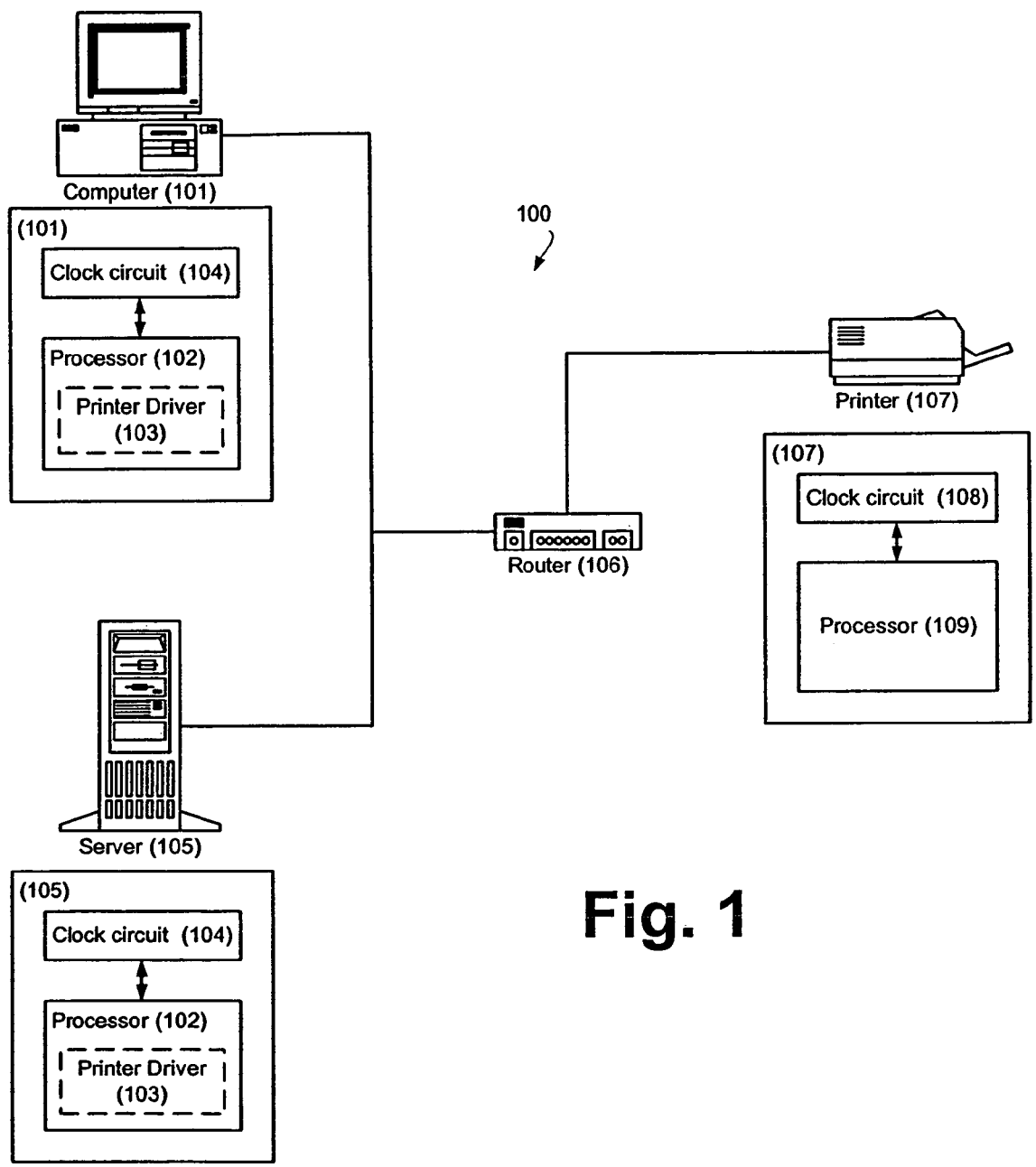
FIG. 1 is a block diagram of a network including a printer and print clients implementing the present invention so that the printer can track the current date and time.

FIG. 1 is a block diagram of a local area network ("LAN") that includes a printer and print clients. These networked devices implement the present invention so that the printer can track the current date and time. As will be appreciated by those skilled in the art, FIG. 1 could also represent a wide area network in which the present invention may also be implemented.

As shown in FIG. 1, the LAN (100) includes a printer (107). The printer (107) may be any type of printing device, including but not limited to, a laser printer, an ink jet printer, a dot-matrix printer, a fax machine, an electronic copier, a plotter or the like.

The LAN (100) also includes a number of printer clients, devices which send data to the printer (107) for printing. In the example of FIG. 1, these printer clients include a networked desktop computer (101) and a server (105). It will be understood by those skilled in the art that a number of other devices could also be connected to the network (100) and serve as printer clients. For example, a laptop computer, a modem or the like.

A router (106) serves as the backbone of the network (100). The router (106) appropriately routes communications between networked devices (101, 105, 107).

Each printer client (101, 105) has a printer driver (103) which is a piece of software running on the client processor (102). When the printer client (101, 105) sends data to the printer for printing, the printer driver (103) processes the data and transmits it via the network (100) to the printer (107) in a form required by the printer. The printer (107) can then receive and print the data as desired.

Most printer clients, particularly computers (101) and servers (105), also include an internal clock circuit (104) which tracks the current date and time. This date/time data is continuously available to the processor (102) of the printer client. Most computers display the current date and time as part of the user interface on the unit's monitor.

Under the principles of the present invention, the printer driver (103) on each printer client (101, 105) is modified so as to include in each job sent to the printer (107) an indication of the current date and time as tracked by the clock circuit (104) of that printer client (101, 105). This information is received by the printer (107) with the transmission of the print job.

The processor (109) of the printer (107) extracts the date/time data from the print job transmission and uses that information to automatically set or adjust a clock circuit (108) internal to the printer (107). The preferred method of using the date/time data sent with a print job transmission to set the printer's clock circuit (108) will be detailed below. In any event, by these means, the present invention allows the printer (107) to track the current date and time with its own clock circuit (108), and set, reset or adjust that clock circuit (108) automatically without requiring any time or intervention on the part of the printer owner or user.

Figure 2:
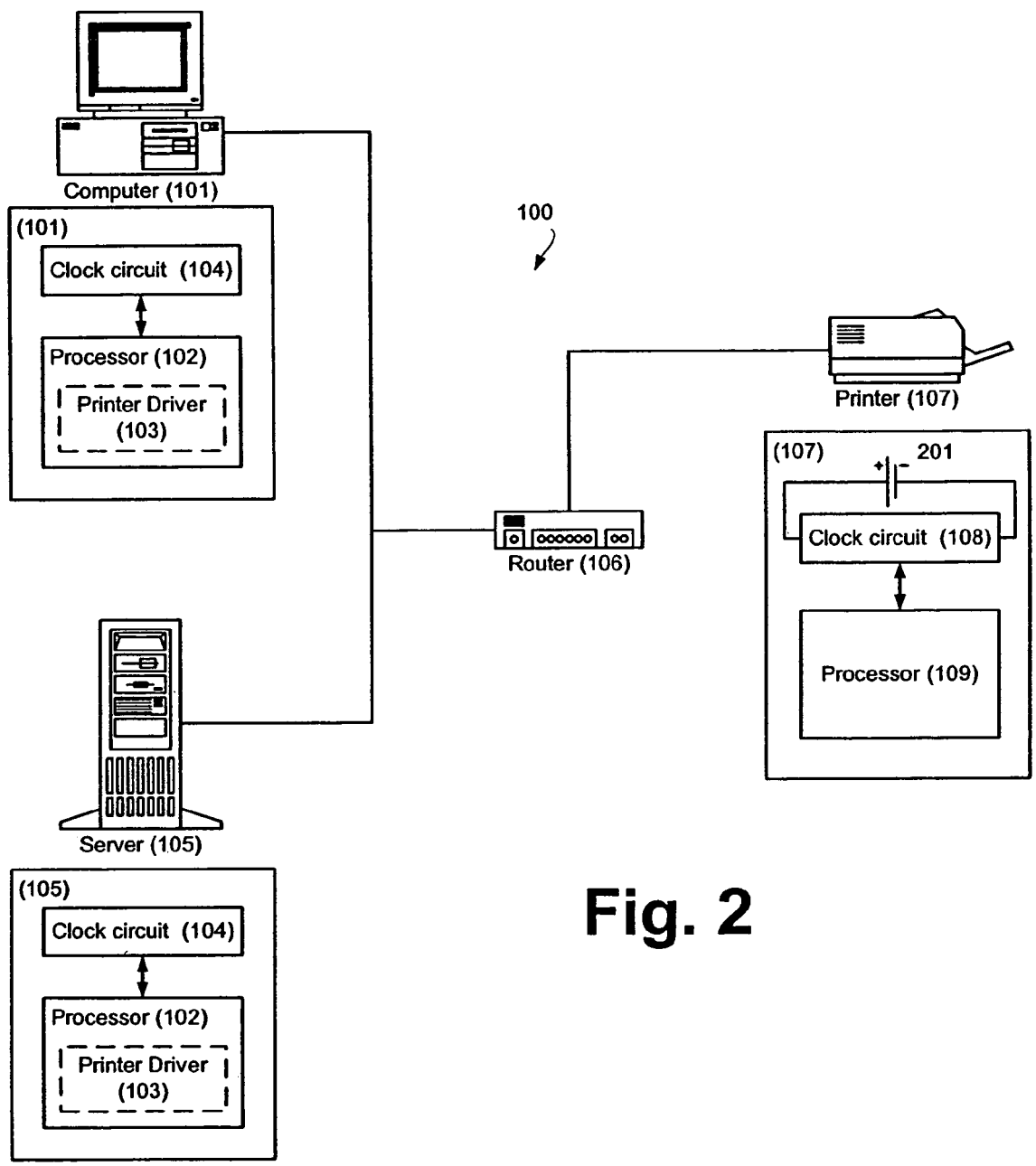
FIG. 2 is a block diagram of a network including a printer and print clients implementing a second embodiment of the present invention.

FIG. 2 illustrates a second embodiment of the network (100) implementing the present invention. Identical reference numerals indicate identical elements as those illustrated and described in connection with FIG. 1.

As shown in FIG. 2, the printer (107) may include a battery (201) which is connected across the clock circuit (108) of the printer (107). With the battery (201) in place, the clock circuit (108) in the printer is able to continue keeping the current date and time even if the printer (107) looses power or is disconnected from its power source.

Figure 3:
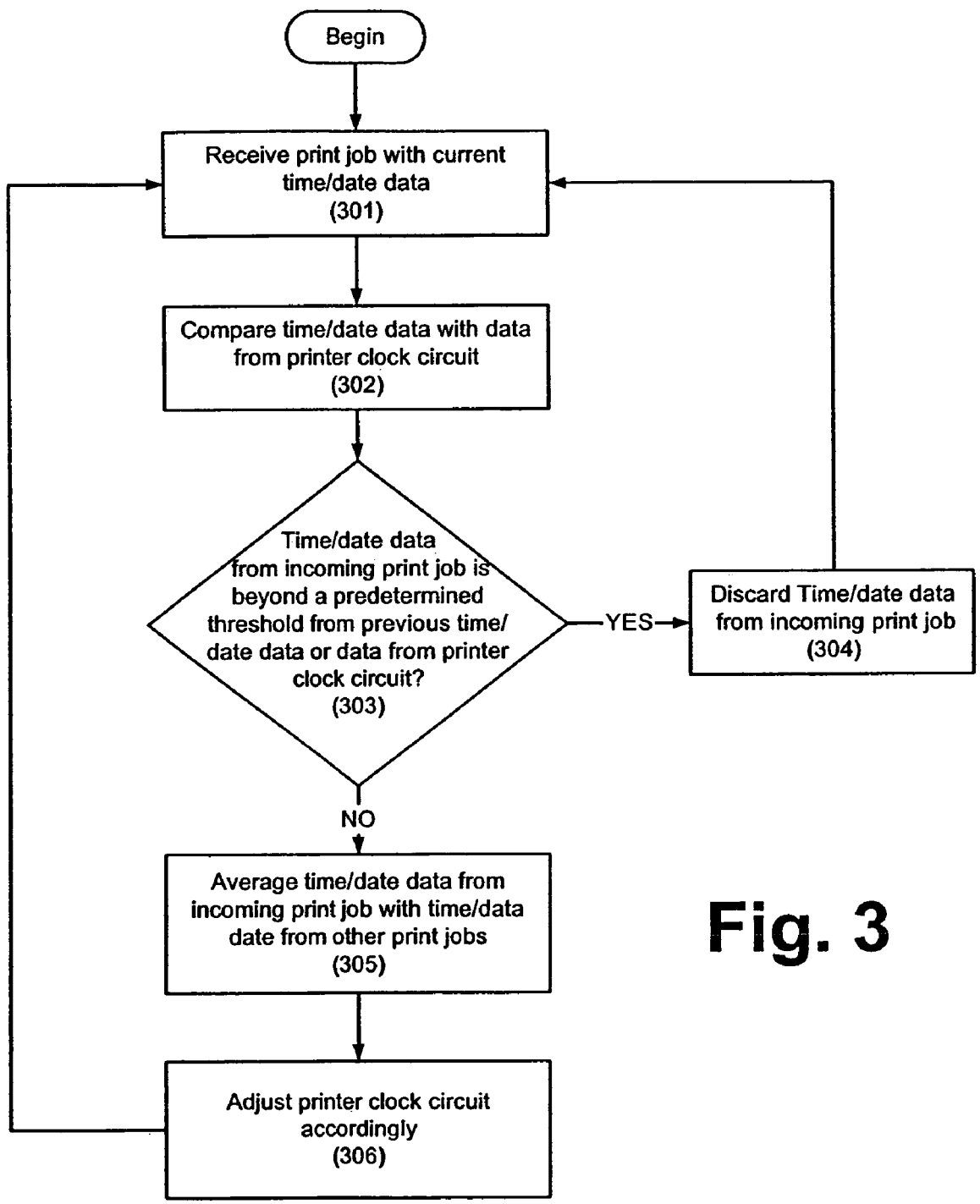
FIG. 3 is a flowchart of a method according to the present invention by which a printer can track the current date and time.

FIG. 3 is a flow chart detailing the method by which the date/time data from the printer client (101, 105) is used by the printer (107) to maintain the most accurate tracking of the current date and time. As shown in FIG. 3, the method begins when time/date data are sent to the printer (107) with a print job from a printer client. (301). The processor (109) of the printer (107) will extract the time/date data from the print job transmission and compare that most recent incoming time/data data with the time/date reading of the clock circuit (108) in the printer (107) and/or other time/date data received with previous print jobs. (302).

As some time/date data transmitted to the printer (107) may be completely erroneous, the processor (109) of the printer (107) is preferably programmed to ignore any time/date data the is beyond a predefined threshold from the time/data data previously received or the current reading of the printer's clock circuit (108). For example, the processor (109) of the printer (107) may take a sample of time/data data readings with incoming print jobs, look at the distribution of those data points and determine the standard deviation.

Then, if the incoming time/date data is more than a standard deviation (303) away from the time/date data received with previous print jobs as sampled by the processor (109), the incoming time/date data may be presumed to be erroneous and discarded (304). If, however, the incoming time/date data is not more than a standard deviation (303) away from the data available to the printer's processor (109), the time/date data provided with the current print job can be averaged with previous time/data data provided with other print jobs from the same or other printer clients (305). The current date and time as determined by this averaging process can then be used to adjust the reading of the printer's clock circuit (108) accordingly. (306).

Thus, the printer (107) automatically adjusts its clock circuit (108) to an average time/date as kept by the clocks circuits (104) of all the printer client devices (101, 105) sending print jobs to the printer (107). Presumably, this average time is generally more accurate than relying on the time/date data from any single printer client device. Moreover, the setting of the printer's clock circuit (108) is automatic and dynamic to constantly reflect the best time/date data available to the printer (107).

The averaging of previously received time/date data with the time/date date provided with the current print job can be accomplished in a number of ways. A preferred example would be as follows. The printer's processor (109) will count the number of print jobs received (N) that include time/date data. The current reading of the printer's clock circuit is then weighted to reflect the number (N) of time/date data readings that have been received and used to set the printer's clock circuit. If, for example, 10 time/date data readings have been received with previous print jobs, the current reading of the printer's clock circuit may be multiplied by 10 and then added to the time/date reading associated with the current incoming print job. Division by 11 then provides an averaged time/date reading that is appropriately weighted to reflect the data received with previous print jobs, but also reflects the latest date/time data received.

The printer's clock circuit (108) may then be adjusted to reflect the calculated average. The printer's clock circuit (108) is preferably adjusted so that its adjusted reading ($x_2$) equals its previous reading ($x_1$) times the number of print jobs received that include time/data data (N) plus the time/date data from the incoming print job ($T_1$) divided by N+1; or $$x_2=[x_1(N)+T_1]/N+1.$$

Additionally, the number N may be limited to a predetermined maximum value, for example, 10. This will prevent the average from becoming completely unresponsive to newly received time/date date carried by incoming print jobs.

Figure 4:
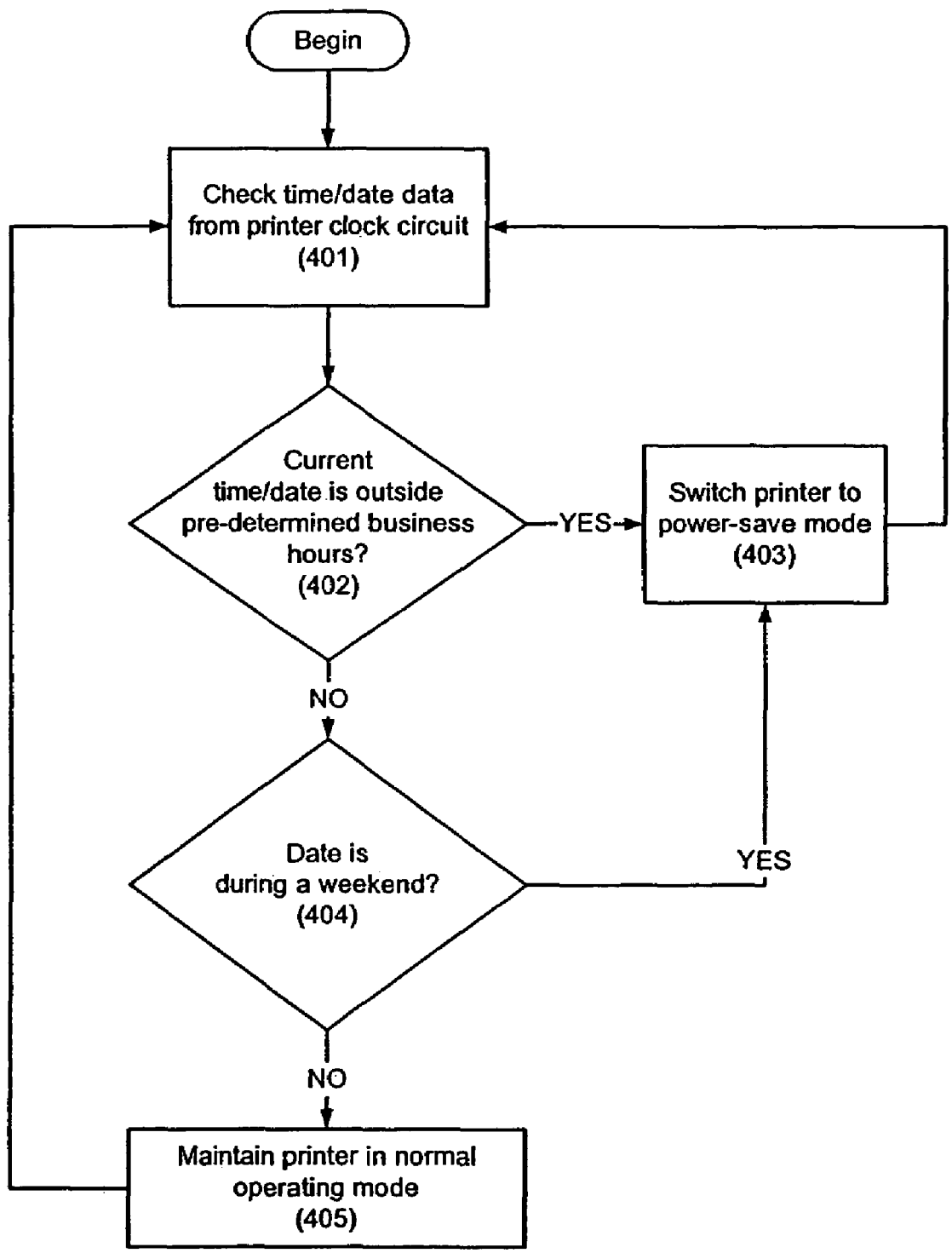
FIG. 4 is a flowchart of a method according to the present invention by which the operating mode of the printer is controlled by the current date and time.

FIG. 4 is a flowchart illustrating a method of better managing a printer using the principles of the present invention. As will be appreciated by those skilled in the art, printers can require a substantial amount of power to be ready to print data received from a printer client device. For example, in a laser printer, toner applied to a sheet of paper to form the printed image is heat-sealed to the paper with a heating element called a fuser nip. Maintaining the fuser nip at sufficient temperature to heat-seal toner requires power and generates heat. The power required by the fuser nip and the heat generated are wasted if the printer is not being used to print documents.

Consequently, in this and other similar circumstances depending on the type of printer involved, the printer is programmed to enter a power-save mode when unused for specified period of time. This allows the printer to save power and reduce unwanted thermal energy when not is use. However, time is required to bring the printer from the power-save mode back into an operating mode. For example, in a laser printer, the fuser nip must be heated. Therefore, if the printer is unused for a period of time during regular working hours, e.g. 8:00 am to 5:00 pm, and consequently goes into power-save mode, anyone needing to print will have to send the print job to the printer and then be required to wait for the printer to come out of power-save mode and "warm-up" before printing can be accomplished.

Under the method illustrated in FIG. 4, this situation can be avoided and the printer operation better managed by the present invention. As shown in FIG. 4, the printer processor will periodically check the time/date data output by the printer's clock circuit (401). The processor will determine whether the time data output by the printer's clock circuit falls outside pre-determined business hours (402).

These pre-determined business hours may be standard hours pre-programmed into the printer, such as 9:00 am to 5:00 pm, or may be specific hours programmed into the printer by the user as reflective of the user's specific work habits or the habits of those operating the various printer client devices. The pre-determined hours may also include multiple blocks of time, e.g., 9:00 am to 12:00 pm and 1:00 pm to 5:00 pm.

If upon consideration of the time data output by the printer's clock circuit, the printer determines that the current time is outside the pre-defined business hours, the printer will then switch into power-save mode (403), if not then in use. As an additional feature, the printer may require a period during which no print jobs are received after the expiration of the pre-defined business hours before entering into power-save mode.

If the time is within the pre-defined business hours, the printer processor may then check the date data output by the printer's clock circuit to determine if the date is a weekend day, i.e., Saturday or Sunday. (404). If so, the printer may remain in, or switch to power-save mode, if not then in use.

Otherwise, if the printer's clock circuit indicates that the current time is within pre-defined business hours and the current date is not a weekend, the printer may be maintained in normal operating mode so as to be ready at all times to print documents for the printer clients without requiring time to switch from power-save mode to normal operating mode. Similarly at the commencement of the pre-defined business hours, the printer may automatically bring itself into normal operating mode from power-save mode so as to be ready for any incoming print job.

As will be appreciated by those skilled in the art, the printer processor (104) may also be programmed to recognize holidays or other days during which the printer would not routinely be used and should, therefore, be in power-save mode unless a print job is received. This feature can be made completely programmable by the printer owner or user to provide maximum flexibility in efficiently operating the printer.

Figure 5:
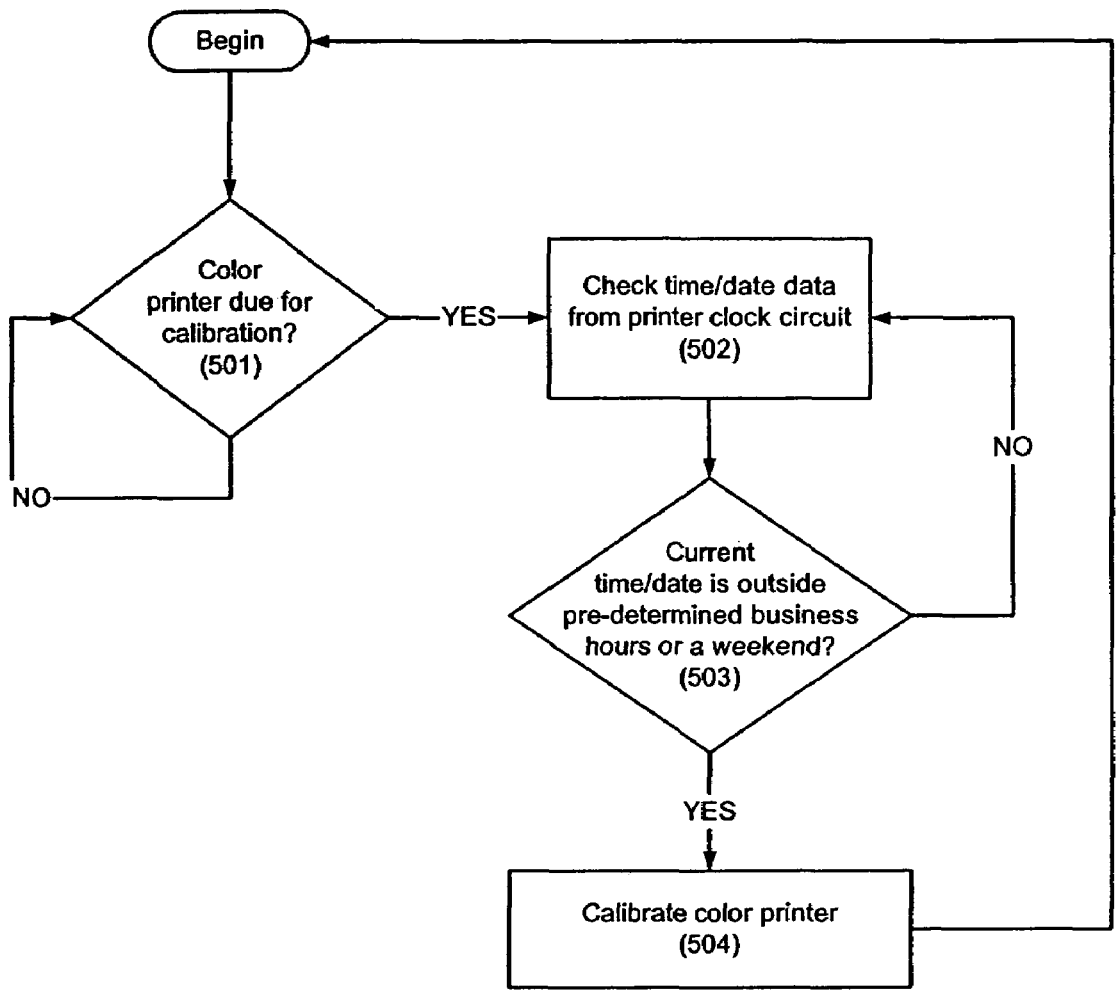
FIG. 5 is a flowchart of a method according to the present invention by which the calibration of a color printer is controlled by the current date and time.

FIG. 5 is a flowchart detailing another specific application of the present invention. As will be known by those skilled in the art, color printers periodically require calibration. This calibration is performed automatically by the printer, but requires some time to complete during which time no print jobs can be executed. Consequently, this may be inconvenient for a printer user who needs something printed during the period of time the printer is recalibrating.

The present invention can solve this problem as follows. The printer processor will be programmed to recalibrate the color printer periodically based on an appropriate measure of the need for recalibration (501). When calibration is indicated, the printer processor first checks the current time/date data output by the printer's clock circuit (502). If the printer clock circuit indicates that the time and date are outside pre-determined business hours or on a weekend, holiday or other non-business day (503), calibration is commenced (504).

However, if the current date and time are within business hours on a working day, the calibration is delayed until after the predetermined business hours. In this way, the printer is much more likely to be available when needed by a printer client rather than being caught in a calibration procedure during which print jobs cannot be executed.

Preferably, this method is set so that calibration is considered "due" and is attempted, and hopefully completed, at some predetermined lead time before calibration is actually needed or critical to the effective operation of the printer. In this way, recalibration is always likely to be accomplished before becoming critically necessary and before any loss of print quality occurs.

These are just some examples of uses of the present invention. Another application would be having the printer time stamp print jobs as they are printed based on the time/date data provided by the printer's internal clock circuit. Those skilled in the art will recognize other applications for better printer management that can be implemented in a printer that accurately maintains the current date and time. These additional applications are also within the spirit and scope of the present invention.

The present invention also encompasses the software or computer-readable instructions which can be used to cause printer client devices and a printer to implement the principles of the present invention. For example, the present invention includes computer-readable instructions incorporated into the printer driver in a printer client that cause the printer client to append time/date data from the printer client's internal clock circuit to a print job transmission sent to the printer. The present invention also includes the computer-readable instructions that cause the printer processor, microprocessor or firmware to receive and extract the time/date data from the print job transmissions and use that time/date data to set or adjust the time kept by a clock circuit internal to the printer. The present invention also includes the computer-readable instructions that cause the processing device of the printer (hardware or firmware) to use the time/date data output by the printer's clock circuit to more effectively manage the printer.

In this regard, computer-readable instructions include, but are not limited to, software, such as object or source code, written in any language, as well as firmware. The processing device or processor means receiving the instructions may be, but is not limited to, a host computer, a microprocessor (in a computer or printing device), an ASIC (in a computer or printing device) or firmware.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A system for tracking time and date with a printer and managing that printer accordingly, the system comprising:
    a printer having a clock circuit; and
    one or more printer clients, each having a clock circuit; wherein:
    a printer driver of said printer client appends time/date data from said clock circuit of that printer client to a print job being transmitted to said printer; and
    said printer extracts said time/date data from said print job transmission and uses said time/date data to set or adjust said clock circuit of said printer.

2. The system of claim 1, wherein said printer compares said time/date data received with said print job to time/date data from said clock circuit of said printer or other time/date data received with other print jobs.

3. The system of claim 2, wherein said printer rejects said time/date data if beyond a predetermined threshold relative to other time/date data received.

4. The system of claim 3, wherein said printer rejects said time/date data if more than a standard deviation away from a sampling of other time/data data received.

5. The system of claim 1, wherein said printer averages said time/date data received with said print job with other time/date data received with other print jobs and then sets or adjusts said clock circuit of said printer according to a resulting average of all said time/date data.

6. The system of claim 1, wherein said clock circuit of said printer is connected to a battery as a back-up power source.

7. The system of claim 1, wherein said printer is maintained in an operating mode during pre-defined hours and days based on output from said clock circuit of said printer.

8. The system of claim 1, wherein said printer avoids performing a calibration procedure during pre-defined hours and days based on output from said clock circuit of said printer.

9. A method of tracking time and date with a printer and managing that printer accordingly, the method comprising:
    appending time/date data to a print job sent to said printer from a printer client having a clock circuit; and
    extracting said time/date data from said print job and using said time/date data to set or adjust a clock circuit of said printer.

10. The method of claim 9, further comprising comparing said time/date data received with said print job to time/date data from said clock circuit of said printer or other time/date data received with other print jobs.

11. The method of claim 10, further comprising rejecting said time/date data if beyond a predetermined threshold from said other time/date data.

12. The method of claim 9, further comprising averaging said time/date data received with said print job with other time/date data received with other print jobs and then setting or adjusting said clock circuit of said printer according to a resulting average of all said time/date data.

13. The method of claim 9, further comprising maintaining said printer in an operating mode during pre-defined hours and days based on output from said clock circuit of said printer.

14. The method of claim 9, further comprising avoiding performance a calibration procedure during pre-defined hours and days based on output from said clock circuit of said printer.

15. A system of tracking time and date with a printer and managing that printer accordingly, the system comprising:
    means for appending time/date data to a print job sent to said printer from a printer client having a clock circuit that outputs time/date data; and
    means for extracting said time/date data from said print job and using said time/date data to set or adjust a clock circuit of said printer.

16. The system of claim 15, further comprising means for comparing said time/date data received with said print job to time/date data from said clock circuit of said printer or other time/date data received with other print jobs.

17. The system of claim 16, further comprising means for rejecting said time/date data if beyond a predetermined threshold relative to said other time/date data.

18. The system of claim 15, further comprising:
    means for averaging said time/date data received with said print job with other time/date data received with other print jobs; and
    means for setting or adjusting said clock circuit of said printer according to a resulting average of all said time/date data.

19. The system of claim 15, further comprising means for maintaining said printer in an operating mode during pre-defined hours and days based on output from said clock circuit of said printer.

20. The system of claim 15, further comprising means for avoiding performance a calibration procedure during pre-defined hours and days based on output from said clock circuit of said printer.

21. Computer-readable instructions recorded in a medium for storing computer-readable instructions, said instructions being used by a system of tracking time and date with a printer and managing that printer accordingly, wherein said a first set of said instructions causes a processing device in a printer client device to append time/date data to a print job sent to said printer, where said printer client device has a clock circuit that outputs time/date data, and
    wherein a second set of said instructions causes a processing device in said printer to extract said time/date data from said print job and use said time/date data to set or adjust a clock circuit of said printer.

22. The computer-readable instructions of claim 21, wherein said second set of said instructions further causes said processing device in said printer to compare said time/date data received with said print job to time/date data from said clock circuit of said printer or other time/date data received with other print jobs and reject said time/date data if beyond a standard deviation from said other time/date data.

23. The computer-readable instructions of claim 21, wherein said second set of said instructions further causes said processing device in said printer to average said time/date data received with said print job with other time/date data; and set or adjust said clock circuit of said printer according to a resulting average of all said time/date data.

24. A system for tracking time and date with a printer and managing that printer accordingly, the system comprising:
- a printer having a clock circuit that tracks and outputs date and time information; and
- one or more printer clients, each having a clock circuit that tracks and outputs date and time information;

wherein:
- a printer driver of said printer client appends time/date data from said clock circuit of that printer client to a print job being transmitted to said printer; and
- said printer extracts said time/date data from said print job transmission and uses said time/date data to set or adjust said clock circuit of said printer.

25. The system of claim 24, wherein said printer compares said time/date data received with said print job to time/date data from said clock circuit of said printer or other time/date data received with other print jobs.

26. The system of claim 25, wherein said printer rejects said time/date data if beyond a predetermined threshold relative to other time/date data received.

27. The system of claim 26, wherein said printer rejects said time/date data if more than a standard deviation away from a sampling of other time/data data received.

28. The system of claim 24, wherein said printer averages said time/date data received with said print job with other time/date data received with other print jobs and then sets or adjusts said clock circuit of said printer according to a resulting average of all said time/date data.

29. The system of claim 24, wherein said clock circuit of said printer is connected to a battery as a back-up power source.

30. The system of claim 24, wherein said printer is maintained in an operating mode during pre-defined hours and days based on output from said clock circuit of said printer.

31. The system of claim 24, wherein said printer avoids performing a calibration procedure during pre-defined hours and days based on output from said clock circuit of said printer.

* * * * *

UNITED STATES PATENT AND TRADEMARK OFFICE
CERTIFICATE OF CORRECTION

PATENT NO. : 7,054,019 B1  
APPLICATION NO. : 09/654815  
DATED : May 30, 2006  
INVENTOR(S) : Shell S. Simpson Page 1 of 1

It is certified that error appears in the above-identified patent and that said Letters Patent is hereby corrected as shown below:

In Drawings  
On sheet 3 of 5, in "FIG. 3", box "305", lines 2-3, delete "time/data date" and insert -- time/date data --, therefor.

In column 4, line 12, delete "time/data" and insert -- time/date --, therefor.

In column 4, line 19, delete "time/data" and insert -- time/date --, therefor.

In column 4, line 21, delete "time/data" and insert -- time/date --, therefor.

In column 4, line 33, delete "time/data" and insert -- time/date --, therefor.

In column 5, line 1, delete "time/data" and insert -- time/date --, therefor.

In column 7, line 48, in Claim 4, delete "time/data" and insert -- time/date --, therefor.

In column 10, line 8, in Claim 27, delete "time/data" and insert -- time/date --, therefor.

Signed and Sealed this

Eighteenth Day of August, 2009

David J. Kappos  
*Director of the United States Patent and Trademark Office*